United States Patent [19]

Barbee et al.

[11] Patent Number: 4,501,879
[45] Date of Patent: Feb. 26, 1985

[54] POLYESTERAMIDES AND CONTAINERS HAVING IMPROVED GAS BARRIER PROPERTIES FORMED THEREFROM

[75] Inventors: Robert B. Barbee; Roy K. Bass; Burns Davis, all of Kingsport; Larry A. Minnick, Bluff City, all of Tenn.

[73] Assignee: Eastman Kodak Company, Rochester, N.Y.

[21] Appl. No.: 593,057

[22] Filed: Mar. 26, 1984

[51] Int. Cl.[3] .............................................. C08G 63/44
[52] U.S. Cl. .................................... 528/288; 528/183; 528/208; 528/290; 528/292; 528/293
[58] Field of Search ............... 528/183, 208, 288, 290, 528/292, 293

[56] References Cited

U.S. PATENT DOCUMENTS

| | | | |
|---|---|---|---|
| 3,996,201 | 12/1976 | Buxbaum | 528/292 X |
| 4,116,943 | 9/1983 | Ducarre | 528/288 X |
| 4,426,512 | 1/1984 | Barbee et al. | 528/173 |

Primary Examiner—Lucille M. Phynes
Attorney, Agent, or Firm—Clyde L. Tootle; David E. Cotey; J. Frederick Thomsen

[57] ABSTRACT

The present invention provides novel polyesteramides and containers having improved gas barrier properties formed therefrom. The novel polyesteramides comprise the reaction product of a diamine having 2 to about 20 carbon atoms, a diol containing up to about 24 carbon atoms, and a dicarboxylic acid component. The dicarboxylic acid component consists essentially of about 5 to 100 mole % of a specified first, heteroatom-containing dicarboxylic acid, and 0 to about 95 mole % of a second dicarboxylic acid containing up to about 24 carbon atoms. In the polyesteramide, the diamine component comprises about 10 to 90 mole % of the total diamine and diol components. The present invention further provides containers, such as molded containers, films, coextruded articles, laminated articles, etc., formed from the polyesteramides of the present invention.

40 Claims, No Drawings

POLYESTERAMIDES AND CONTAINERS HAVING IMPROVED GAS BARRIER PROPERTIES FORMED THEREFROM

DESCRIPTION

The present invention relates to a class of novel polyesteramides and to packages made from such polyesteramides.

Presently there is a strong interest in the packaging industry for protecting comestibles, such as foodstuffs, medicines, and especially carbonated beverages, by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have, as indicated, many desirable characteristics, there is a need in the art to provide improved polyester containers which will have gas permeabilities which are lower than those of containers formed from polyethylene terephthalate. Such improved containers would be much more versatile in their utilization and allow the containers to be used to package substances for which the polyethylene terephthalate containers may not be suitable.

The present invention provides novel polyesteramides which are suitable for use in forming packages for protecting comestibles. The present invention also provides improved containers made of the polyesteramides which exhibit improved resistance to gas permeability.

The polyesteramides of the present invention comprise a diamine having up to about 20 carbon atoms, a diol having up to about 24 carbon atoms, and a diacid component. The diacid component comprises about 5 to 100 mole % of a first, heteroatom-containing dicarboxylic acid and correspondingly about 0 to 95 mole % of a second dicarboxylic acid. Containers formed from the novel polyesteramides of the present invention exhibit a desirable balance of physical properties, including improved gas barrier properties, which render them advantageous for use in the packaging of comestibles.

U.S. Pat. Nos. 3,408,334 and 3,522,328 describe polyamides and polyesteramides prepared from p-phenylenedioxydiacetic acid. *Makromolecular Chem.*, 32, 1 (1959) also describes this acid. U.S. Pat. Nos. 2,973,339, 3,558,557, 4,188,353, 4,384,106, and 4,398,071 disclose polyesters prepared from heteroatom-containing glycols. None of these references discloses the novel polyesteramides of the present invention and/or the properties thereof which render them useful as high barrier packaging materials.

U.S. Pat. No. 4,440,922 discloses containers made from a thermoplastic polyester which consists essentially of the reaction product of a diol and a diacid component which consists essentially of 5 to 100 mole % of a phenylenedioxydiacetic acid and 0 to about 95 mole % of terephthalic acid. U.S. Pat. No. 4,436,895 discloses containers formed from a polyester resin comprising the reaction product of a diol and a diacid component which comprises terephthalic acid and about 1 to 50 mole % of a second diacid selected from iminodiacetic acid, oxydiacetic acid, thiodiacetic acid, and mixtures thereof. Neither of these patents discloses or suggests polymers which additionally contain amide linkages within the polymer chain nor the use of such polymers in containers for comestibles.

U.S. patent application Ser. No. 551,397, filed Nov. 14, 1983, discloses containers formed from a polyamide resin comprising the reaction product of an aliphatic diamine and a dicarboxylic acid component which consists essentially of about 50 to 100 mole % of a heteroatom-containing dicarboxylic acid and 0 to about 50 mole % of a second dicarboxylic acid containing up to about 12 carbon atoms. This application relates solely to polyamides and neither discloses nor suggests the inclusion of ester linkages in the polymer chain.

U.S. patent application Ser. No. 570,146, filed Jan. 12, 1984, discloses polyesters derived from a dicarboxylic acid component which comprises at least 90 mole % of a heteroatom-containing diacid and a diol component which includes at least 75 mole % of a heteroatom-containing diol. The application also discloses containers made from the polyesters described therein. Again, the inclusion of amide linkages in the polymer chain is neither disclosed nor suggested by the disclosure of this application.

It has now been found that containers which are formed from specified polyesteramide compositions exhibit desirable physical properties, including improved gas barrier properties, which render them advantageous for use in the packaging of comestibles.

SUMMARY OF THE INVENTION

The present invention in one aspect provides a class of novel polyesteramides having improved gas barrier properties. The polyesteramides comprise the reaction product of a diamine having 2 to about 20 carbon atoms; a diol containing up to about 24 carbon atoms; and a dicarboxylic acid component. The dicarboxylic acid component consists essentially of about 5 to 100 mole percent of a first, heteroatom-containing dicarboxylic acid and 0 to about 95 mole percent of a second dicarboxylic acid containing up to about 24 carbon atoms. The first dicarboxylic acid is of the formula

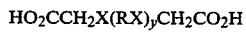

wherein X represents —O—, —S—, or

y is 0 or 1, and R represents an aromatic moiety comprising 6 to about 24 carbon atoms. The diamine component of the polyesteramide comprises about 10 to 90 mole percent of the total of the diamine and diol components in the polyesteramide.

In another aspect, the present invention provides containers formed from the polyesteramides described herein. Such containers may take the form of molded containers, films, coextruded articles, laminated articles, etc.

DETAILED DESCRIPTION OF THE INVENTION

The invention described herein relates to specified polyesteramide compositions and to containers formed therefrom.

As used herein, the term "container" is intended to mean shaped articles formed from a specified polyesteramide which are suitable for use in packaging comestibles. Such shaped articles include sheets and films which are extruded from the polyesteramide and which may be used as barrier layers, container liners, as components of laminates or other compositions, etc. Such shaped articles also include molded containers, such as bottles.

The polyesteramides of the present invention comprise the reaction product of a diamine component, a diol component, and a dicarboxylic acid component. The diamine component comprises at least one diamine having 2 to about 20 carbon atoms (e.g., 2 to about 14 carbon atoms). The diamine can be either aliphatic or aromatic. The aliphatic diamines can contain aromatic moieties as long as such aromatic moieties are separated from the amino groups by at least one methylene (—CH$_2$—) group. Thus, examples of suitable aliphatic diamines include 1,2-ethylenediamine, 1,3-propylenediamine, 1,6-hexylenediamine, 1,12-dodecylenediamine, piperazine, 1,4-cyclohexanebismethylamine, p-xylylenediamine, m-xylylenediamine, mixtures thereof, etc.

The aromatic diamines are represented by such compounds as m-phenylenediamine, p-phenylenediamine, methylenebisaniline, the isomeric toluenediamines, the isomeric naphthalenediamines, mixtures thereof, etc. Preferred aromatic diamines are m-phenylenediamine, p-phenylenediamine, and mixtures thereof.

Of all of the diamines specifically mentioned above, preferred diamines include m-phenylenediamine, p-phenylenediamine, 1,6-hexylenediamine, piperazine, m-xylylenediamine, p-xylylenediamine, mixtures thereof, etc.

The polyesteramides of the present invention further comprise a diol component. The diol component comprises at least one diol containing up to about 24 carbon atoms (e.g., up to about 24 carbon atoms). For example, the diol component may comprise an aliphatic glycol, preferably containing up to about 12 carbon atoms. Examples of such compounds include ethylene glycol, propylene glycol, 1,4-butanediol, neopentyl glycol, 1,6-hexanediol, 1,2-cyclohexanedimethanol, 1,3-cyclohexanedimethanol, 1,4-cyclohexanedimethanol, diethylene glycol, mixtures thereof, etc. The diol component preferably comprises ethylene glycol, 1,4-butanediol, or 1,4-cyclohexanedimethanol, and more preferably comprises ethylene glycol or 1,4-butanediol. Most preferably, the diol component comprises ethylene glycol. Additionally, minor amounts (i.e., less than about 50 mole percent, and, preferably, less than about 10 mole percent, based on the total amount of diol present in the polyesteramide) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; 2,2-dimethyl-1,3-propanediol; 2,2-diethyl-1,3-propanediol; 2-methyl-2-propyl-1,3-propanediol; 1,3-butanediol; 1,5-pentanediol; 2,2,4,4-tetramethyl-1,3-cyclobutanediol; o-, m-, and p-xylylene diols; and other well known polyester-forming diols.

In another preferred embodiment of the present invention, the diol component comprises a heteroatom-containing diol of the formula

HOCH$_2$CH$_2$XRXCH$_2$CH$_2$OH wherein X represents —O—, —S—, or

and R represents an aromatic moiety comprising 6 to about 24 carbon atoms (e.g., 6 to about 14 carbon atoms).

In those embodiments wherein the heteroatom-containing diol of the above formula is present in the polyesteramide, such diol may be present in an amount of at least about 10% by weight (e.g., about 10 to 100% by weight), based upon the total weight of the diol component.

In the above formula for the heteroatom-containing diol, X preferably represents —O—. Furthermore, R preferably represents a phenylene group. Thus, the heteroatom-containing diol preferably comprises 1,2-, 1,3-, or 1,4-bis(2-hydroxyethoxy)benzene, or a mixture thereof.

The polyesteramides of the present invention further comprise a diacid component. The diacid component consists essentially of about 5 to 100 mole % of a first, heteroatom-containing dicarboxylic acid. This first dicarboxylic acid is of the formula HO$_2$CCH$_2$X(RX)$_y$CH$_2$CO$_2$H wherein X represents —O—, —S—, or

y is 0 or 1, and R represents an aromatic moiety comprising 6 to about 24 carbon atoms (e.g., 6 to about 14 carbon atoms). Preferably, the R group of the first dicarboxylic acid is selected from the group consisting of

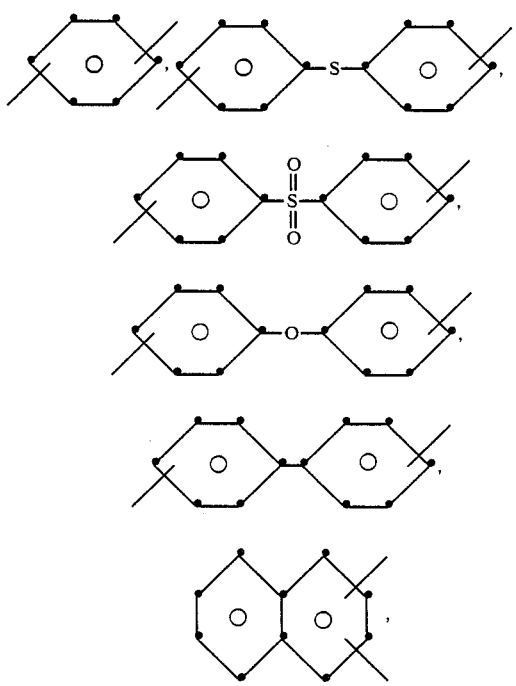

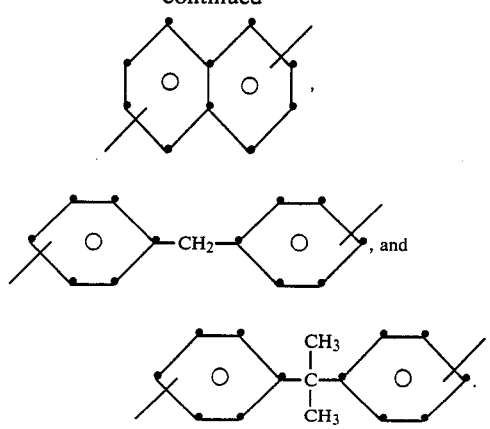

In preferred embodiments, when y in the above formula is 1, R represents a phenylene moiety. In especially preferred embodiments, X in the above formula represents —O—.

Preferred examples of the first dicarboxylic acid include iminodiacetic acid, oxydiacetic acid, thiodiacetic acid, 1,4-phenylenedioxydiacetic acid, 1,3-phenylenedioxydiacetic acid, mixtures thereof, etc. Especially preferred as the first dicarboxylic acid are oxydiacetic acid, 1,3-phenylenedioxydiacetic acid, 1,4-phenylenedioxydiacetic acid, mixtures thereof, etc.

The dicarboxylic acid component of the polyesteramide of the present invention further consists essentially of 0 to about 95 mole % of a second dicarboxylic acid which contains up to about 24 carbon atoms (e.g., up to about 14 carbon atoms). Any of the well-known polyester- or polyamide-forming diacids can be employed. Examples of particularly suitable acids include isophthalic acid, terephthalic acid, 1,4-cyclohexanedicarboxylic acid, sebacic acid, succinic acid, adipic acid, mixtures thereof, etc. Diacids which preferably are employed as the second dicarboxylic acid include isophthalic acid, adipic acid, mixtures thereof, etc.

The term "diacid" as used herein contemplates also the employment of esters, halides, anhydrides, etc., as may be suitable in the context of the present invention.

In the polyesteramides of the present invention, the diamine component comprises about 10 to 90 mole % of the total of the diamine and diol components in the polyesteramide. Preferably, the diamine component comprises about 15 to 75 mole % (e.g., about 20 to 60 mole %) of the total of the diamine and diol components in the polyesteramide.

The polyesteramides of the present invention are synthesized by methods generally known in the art for producing polyesteramides. Typically, stoichiometric quantities of the diacid and diamine components are combined with an excess of the diol component and a catalyst. The amount of the diol component present in the reaction mixture commonly will be in the range of about 5 to 300% by weight in excess of the stoichiometric quantity of diol. The diamine component can also be employed in excess if desired.

In one mode of operation, the diamine can be provided to the reaction system in the form of a salt with one or more diacids. The salt can be prepared by adding the diamine slowly (e.g., dropwise) in a suitable solvent, such as ethanol, to the acid and then heating the mixture to reflux with stirring. Upon cooling of the reaction mixture, a precipitate of the salt can be collected.

The reagents are reacted preferably in a two-stage process. In the first stage, the reactants are contacted with stirring under an inert atmosphere at a temperature of about 150° to 250° C. Volatile by-products are allowed to distill from the reaction mixture. The second stage of the reaction process is then typically carried out at a temperature of about 200° to 300° C. Reduced pressures may be employed in order to remove by-products and excess unreacted diol. In both stages of the condensation reaction, higher temperatures may conceivably be employed, but are less desirable.

Useful catalysts include catalytic amounts of transition metal compounds, such an antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalyst will be present in an amount of about $10^{-5}$ to $10^{-3}$ moles of catalyst per mole of total acid employed. Other catalysts generally used in preparing high molecular weight polyesters may also be employed. The amide portion of the polyesteramide typically does not require a catalyst. However, suitable catalysts which have been disclosed in the literature can be employed if desired.

The polyesteramides which are employed in the present invention exhibit an I.V. of about 0.40 to 1.50. The I.V. is measured at 25° C. in a 60/40 by weight mixture of phenol/tetrachloroethane at a concentration of 0.5 grams per 100 ml. Polymers having an I.V. within the range specified above are of sufficiently high molecular weight to be used in the formation of the containers of the present invention.

Of course, suitable additives, such as dyes, pigments, plasticizers, fillers, antioxidants, stabilizers, etc., may be employed in conventional amounts. Such additives may be added directly to the reaction or may be added to the final polymer.

It has been observed that the polyesteramides of the present invention provide advantageous properties not found in prior art materials. In particular, the polyesteramides of the present invention provide an increased glass transition temperature as compared to previously known high barrier polyesters. Moreover, the polyesteramides of the present invention provide these increases in glass transition temperature while at the same time providing excellent gas barrier properties. Preferably, the polyesteramides of the present invention exhibit a glass transition temperature of at least about 40° C. (e.g., at least about 50° C.).

Furthermore, the polyesteramides of the present invention typically provide polymers having reduced color as compared to certain of the prior art high barrier materials. Additionally, the polyesteramides of the present invention demonstrate improvements in rate of polymerization as compared to certain of the previously known high barrier polyester materials.

The polyesteramides described above may be formed into the containers of the present invention by conventional plastic processing techniques. For example, sheets, films, and other like structures can be formed by well-known extrusion techniques.

Film or sheet material made in accordance with the present invention is strong, flexible, and clear. Such materials can be formed into articles such as wrappers, bags, and the like. The polyesteramides may also be used to form a laminating layer between two or more permeable layers of film. The polyesteramides may also be used for dip coating containers from a polymer solution in order to improve the barrier properties of the package.

Molded containers can be made from the above-described polyesteramides by compression molding, blow molding, or other such molding techniques, all of which are well known in the art.

Containers may also be formed by coextruding (e.g., in the form of a "pipe" or otherwise) a layer of a polyesteramide specified above together with some other suitable thermoplastic resin. Resins which are suitable for forming laminates or coextruded articles in conjunction with the polyesteramide resins disclosed herein include polyethylene terephthalate, poly(1,4-cyclohexylenedimethylene terephthalate), and other such well-known polyesters.

The above-described containers of the present invention are ideally suited for protecting comestibles, such as foodstuffs (especially carbonated soft drinks), medicines, and like substances. The advantages of these container materials are due to low oxygen and carbon dioxide permeability in combination with the other desirable properties mentioned above relative to such prior art materials as polyethylene terephthalate.

This invention will be further illustrated by the following Examples, although it will be understood that these Examples are included merely for purposes of illustration and are not intended to limit the scope of the invention.

EXAMPLE 1

This Example illustrates the preparation of a polyesteramide from m-xylylenediamine, ethylene glycol, and 1,3-phenylenedioxydiacetic acid and the improved gas barrier properties of a film formed therefrom. A reaction vessel was charged with 150.39 g of 1,3-phenylenedioxydiacetic acid, 61.88 g of ethylene glycol, 22.62 g of m-xylylenediamine, and 50 ml water. The reaction mixture was maintained under nitrogen at 150° C. for 15 minutes with stirring, and then the temperature was increased to 200° C. and was maintained at that temperature for 45 minutes while water distilled from the reaction mixture. As catalyst, 50 ppm of titanium from titanium tetraisopropoxide was then added, and the reaction mixture was maintained at 200° C. for an additional 60 minutes. The temperature was then raised to 260° C., the nitrogen was removed from the reaction vessel, and a vacuum of 0.5 mm Hg was applied to the reaction system for 45 minutes. The source of heat was then removed, and the reaction system was let down to atmospheric pressure with nitrogen. The resulting polymer was collected and determined to have an inherent viscosity of about 0.84.

The resulting polyesteramide, which contained about 25 mol % of m-xylylenediamine units and about 75 mole % of ethylene glycol units, was ground, dried, and pressed into a film about 5 mils thick at about 220° C. The film had an oxygen transmission rate of about 0.26 cc.mil/100 in.$^2$.24 hr.atm, a tensile strength of about 7,500 pounds per square inch, and an elongation of about 2%.

EXAMPLE 2

The procedure of Example 1 was essentially repeated except that 50 mol % of m-xylylenediamine was employed. The resulting polymer had an inherent viscosity of about 0.83. A film prepared therefrom had an oxygen transmission rate of about 0.12 cc.mil/100 in.$^2$.24 hr.atm, a tensile strength of about 8,600 pounds per square inch, and an elongation of about 3%.

EXAMPLE 3

This Example illustrates the preparation of a polyesteramide from 1,3-phenylenedioxydiacetic acid, terephthalic acid, m-xylylenediamine, and ethylene glycol.

The reaction vessel was charged with 145.5 g (0.75 mole) of dimethyl terephthalate, about 93.0 g (1.5 moles) of ethylene glycol, and about 39.98 g (0.11 mole) of a salt which was prepared from 1,3-phenylenedioxydiacetic acid and m-xylylenediamine.

The salt was prepared by first combining 452 g (2 moles) of 1,3-phenylenedioxydiacetic acid, 2,300 ml of ethanol, and 1,000 ml of distilled water. The diamine (278 g; 2.04 moles) in 200 ml of ethanol was added dropwise over a 30-minute period to the acid mixture while the reaction mixture was stirred. The reaction system was then heated to reflux and held at refluxing for two hours with stirring. The reaction system was cooled, and a precipitate formed. The precipitate was collected on filter paper and washed with ethanol. The precipitate was recrystallized by heating in 1,500 ml of water until dissolved and then precipitating the product with 2,500 ml of ethanol. The salt was recrystallized a second time and was then employed in the polymerization.

The reaction mixture for the polyesteramide preparation was heated for about two hours at about 200° C. with stirring under nitrogen. Methanol and water were allowed to distill from the reaction system. The temperature was raised to 270° C., nitrogen was removed, and the reaction was allowed to continue under reduced pressure of about 0.2 mm Hg for about 1 hour. A viscous polymer was formed. The source of heat was removed, and the reaction system was let down to atmospheric pressure with nitrogen. The final polymer, which contained about 12.83 mole % of 1,3-phenylenedioxydiacetic acid units, about 87.17 mole % of terephthalic acid units, about 12.83 mole % of m-xylylenediamine units, and about 87.17 mole % of ethylene glycol units, had an inherent viscosity of about 0.67. The polyesteramide was ground so as to pass a 3.0 mm screen, dried, and extruded into a film about 5 mils thick at about 260° C. The film had an oxygen transmission rate of about 2.5 cc.mil/100 in.$^2$.24 hr.atm, a tensile strength of about 10,800 pounds per square inch, and an elongation of about 6%.

While the invention has been described in detail with particular reference to preferred embodiments thereof, it will be understood that variations and modifications can be effected within the spirit and scope of the invention.

We claim:

1. A novel polyesteramide having improved gas barrier properties which comprises the reaction product of
    (A) a diamine having 2 to about 20 carbon atoms;
    (B) a diol containing up to about 24 carbon atoms; and
    (C) a dicarboxylic acid component consisting essentially of
        (i) about 5 to 100 mole percent of a first, heteroatom-containing dicarboxylic acid of the formula

$HO_2CCH_2X(RX)_yCH_2CO_2H$ wherein X represents —O—, —S—, or $$-\overset{H}{\underset{|}{N}}-,$$

y is 0 or 1, and R represents an aromatic moiety comprising 6 to about 24 carbon atoms, and (ii) 0 to about 95 mole percent of a second dicarboxylic acid containing up to about 24 carbon atoms, wherein component (A) comprises about 10 to 90 mole percent of the total of components (A) and (B) in said polyesteramide.

2. The polyesteramide of claim 1 wherein said diamine comprises an aliphatic diamine.

3. The polyesteramide of claim 2 wherein said aliphatic diamine comprises 1,2-ethylenediamine, 1,3-propylenediamine, 1,6-hexylenediamine, 1,12-dodecylenediamine, piperazine, 1,4-cyclohexanebismethylamine, p-xylylenediamine, m-xylylenediamine, or a mixture thereof.

4. The polyesteramide of claim 1 wherein said diamine comprises an aromatic diamine.

5. The polyesteramide of claim 4 wherein said diamine comprises m-phenylenediamine, p-phenylenediamine, methylenebisaniline, a toluenediamine, a naphthalenediamine, or a mixture thereof.

6. The polyesteramide of claim 5 wherein said diamine comprises m-phenylenediamine, p-phenylenediamine, or a mixture thereof.

7. The polyesteramide of claim 1 wherein said diamine comprises m-phenylenediamine, p-phenylenediamine, 1,6-hexylenediamine, piperazine, m-xylylenediamine, p-xylylenediamine, or a mixture thereof.

8. The polyesteramide of claim 1 wherein said diol comprises an aliphatic glycol.

9. The polyesteramide of claim 8 wherein said glycol comprises ethylene glycol, propylene glycol, 1,4-butanediol, neopentyl glycol, 1,6-hexanediol, 1,2-cyclohexanedimethanol, 1,3-cyclohexanedimethanol, 1,4-cyclohexanedimethanol, diethylene glycol, or a mixture thereof.

10. The polyesteramide of claim 1 wherein said diol comprises a heteroatom-containing diol of the formula

HOCH₂CH₂XRXCH₂CH₂OH wherein X represents —O—, —S—, or $$-\overset{H}{\underset{|}{N}}-,$$

and R represents an aromatic moiety comprising 6 to about 24 carbon atoms.

11. The polyesteramide of claim 10 wherein R represents phenylene.

12. The polyesteramide of claim 10 wherein X represents —O—.

13. The polyesteramide of claim 10 wherein said heteroatom-containing diol comprises 1,2-, 1,3-, or 1,4-bis(2-hydroxyethoxy)benzene, or a mixture thereof.

14. The polyesteramide of claim 1 wherein said R group of said first dicarboxylic acid is selected from the group consisting of

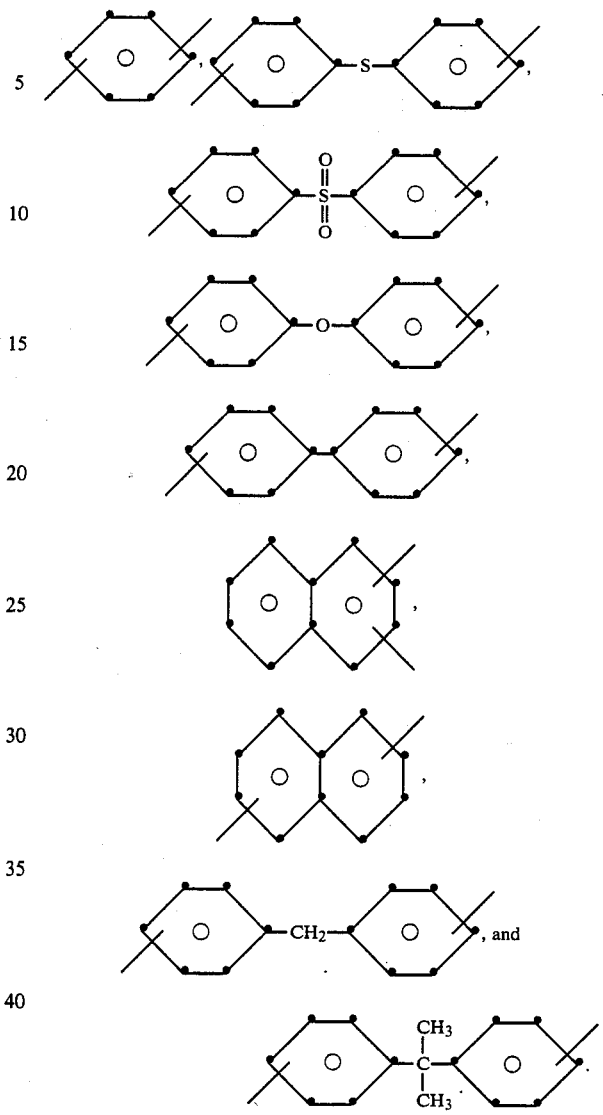

15. The polyesteramide of claim 1 wherein said first dicarboxylic acid comprises iminodiacetic acid, oxydiacetic acid, thiodiacetic acid, 1,4-phenylenedioxydiacetic acid, 1,3-phenylenedioxydiacetic acid, or a mixture thereof.

16. The polyesteramide of claim 1 wherein X represents —O—.

17. The polyesteramide of claim 1 wherein said second dicarboxylic acid comprises isophthalic acid, terephthalic acid, 1,4-cyclohexanedicarboxylic acid, sebacic acid, succinic acid, adipic acid, or a mixture thereof.

18. The polyesteramide of claim 17 wherein said second dicarboxylic acid comprises isophthalic acid, adipic acid or a mixture thereof.

19. The polyesteramide of claim 1 wherein component (A) comprises about 15 to 75 mole percent of the total of components (A) and (B) in said polyesteramide.

20. The polyesteramide of claim 19 wherein component (A) comprises about 20 to 60 mole percent of the total of components (A) and (B) in said polyesteramide.

21. The polyesteramide of claim 1 wherein said polyesteramide exhibits a glass transition temperature of at least about 40° C.

22. A container formed from the polyesteramide of claim 1.

23. A molded container formed from the polyesteramide of claim 1.

24. A film formed from the polyesteramide of claim 1.

25. A coextruded article comprising the polyesteramide of claim 1.

26. A laminated article comprising the polyesteramide of claim 1.

27. A novel polyesteramide having improved gas barrier properties and a glass transition temperature of at least about 40° C. which comprises the reaction product of
(A) a diamine component comprising 1,2-ethylenediamine, 1,3-propylenediamine, 1,6-hexylenediamine, 1,12-dodecylenediamine, piperazine, 1,4-cyclohexanebismethylamine, p-xylylenediamine, m-xylylenediamine, m-phenylenediamine, p-phenylenediamine, methylenebisaniline, a toluenediamine, a naphthalenediamine, or a mixture thereof;
(B) a diol component comprising an aliphatic glycol containing up to about 12 carbon atoms; and
(C) a dicarboxylic acid component consisting essentially of
  (i) about 5 to 100 mole percent of a first, heteroatom-containing diacid comprising iminodiacetic acid, oxydiacetic acid, thiodiacetic acid, 1,4-phenylenedioxydiacetic acid, 1,3-phenylenedioxydiacetic acid, or a mixture thereof, and
  (ii) about 0 to 95 mole percent of a second diacid comprising isophthalic acid, terephthalic acid, 1,4-cyclohexanedicarboxylic acid, sebacic acid, succinic acid, adipic acid, or a mixture thereof,
wherein component (A) comprises about 20 to 60 mole percent of the total of components (A) and (B) in said polyesteramide.

28. The polyesteramide of claim 27 wherein said diamine comprises m-phenylenediamine, p-phenylenediamine, 1,6-hexylenediamine, piperazine, m-xylylenediamine, p-xylylenediamine, or a mixture thereof.

29. The polyesteramide of claim 28 wherein said diamine comprises m-phenylenediamine, p-phenylenediamine, or a mixture thereof.

30. The polyesteramide of claim 27 wherein said glycol comprises ethylene glycol, propylene glycol, 1,4-butanediol, neopentyl glycol, 1,6-hexanediol, 1,2-cyclohexanedimethanol, 1,3-cyclohexanedimethanol, 1,4-cyclohexanedimethanol, diethylene glycol, or a mixture thereof.

31. The polyesteramide of claim 27 wherein said diol component further comprises at least about 10% by weight of a heteroatom-containing diol of the formula $HOCH_2CH_2OROCH_2CH_2OH$ wherein R represents an aromatic moiety comprising 6 to about 14 carbon atoms.

32. The polyesteramide of claim 31 wherein said heteroatom-containing diol comprises 1,2-, 1,3-, or 1,4-bis(2-hydroxyethoxy)benzene, or a mixture thereof.

33. The polyesteramide of claim 27 wherein said first diacid comprises oxydiacetic acid, 1,3-phenylenedioxydiacetic acid, 1,4-phenylenedioxydiacetic acid, or a mixture thereof.

34. The polyesteramide of claim 27 wherein said second diacid comprises isophthalic acid, adipic acid, or a mixture thereof.

35. The polyesteramide of claim 27 wherein said polyesteramide exhibits a glass transition temperature of at least about 50° C.

36. A container formed from the polyesteramide of claim 27.

37. A molded container formed from the polyesteramide of claim 27.

38. A film formed from the polyesteramide of claim 27.

39. A coextruded article comprising the polyesteramide of claim 27.

40. A laminated article comprising the polyesteramide of claim 27.

* * * * *